(12) United States Patent
Kadotani et al.

(10) Patent No.: US 8,870,391 B2
(45) Date of Patent: Oct. 28, 2014

(54) PROJECTOR

(75) Inventors: Norikazu Kadotani, Matsumoto (JP);
Yohei Sakai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 649 days.

(21) Appl. No.: 13/167,853

(22) Filed: Jun. 24, 2011

(65) Prior Publication Data

US 2012/0013853 A1    Jan. 19, 2012

(30) Foreign Application Priority Data

Jul. 14, 2010  (JP) .................................. 2010-159511

(51) Int. Cl.
*G03B 21/18*    (2006.01)
*G03B 21/16*    (2006.01)
*H04N 9/31*    (2006.01)

(52) U.S. Cl.
CPC .............. *G03B 21/16* (2013.01); *H04N 9/3141* (2013.01); *H04N 9/3105* (2013.01)
USPC .......................................... 353/119; 348/58

(58) Field of Classification Search
USPC ....................................... 353/119; 349/58–60
See application file for complete search history.

(56) References Cited

U.S. PATENT DOCUMENTS 6,829,031 B2 * 12/2004 Numata et al. ................. 349/161
7,114,816 B2 * 10/2006 Fujimori et al. .............. 353/119

FOREIGN PATENT DOCUMENTS

| JP | 2001-195006 A | 7/2001 |
| JP | 2002-229121 A | 8/2002 |
| JP | 2009-86195 A | 4/2009 |
| JP | 2010-15011 A | 1/2010 |

* cited by examiner

*Primary Examiner* — Francis M Legasse, Jr.
*Assistant Examiner* — Jerry Brooks
(74) *Attorney, Agent, or Firm* — ALG Intellectual Property, LLC

(57) ABSTRACT

A projector includes: a plurality of light modulating devices; a light combining optical device having a plurality of light incidence planes that faced a corresponding one of the light modulating devices, the light combining optical device configured to combine the color lights modulated by the plurality of light modulating devices; and fixing members each having a plate-like base in which an opening is formed, the fixing members configured to fix the light modulating devices to the light combining optical device, the light modulating devices are fixed to the fixing members in a state in which the light modulating devices are inserted in the openings.

7 Claims, 7 Drawing Sheets

PROJECTOR

CROSS-REFERENCE

The entire disclosure of Japanese Patent Application No. 2010-159511 filed Jul. 14, 2010 is expressly incorporated by reference herein.

BACKGROUND

1. Technical Field

The present invention relates to projectors.

2. Related Art

In the past, a projector which modulates three color lights: R (red), G (green), and B (blue) lights by three liquid crystal panels (light modulating devices), combines the modulated color lights by a cross dichroic prism (a light combining optical device), and projects the resultant light onto a screen has been known.

In such a projector, the light modulating device is integrally attached to the light combining optical device for easier assembly (for example, see JP-A-2009-86195 (Patent Document 1).

In a projector described in Patent Document 1, as a member fixing the light modulating device to the light combining optical device, a plate-like fixing member having an opening through which the light is made to pass and a supporting member which is fixed on the light incidence plane of the light combining optical device and supports the fixing member are provided.

In addition, the light modulating device is screwed to the light incident-side plate face of the fixing member in such a way as to close the opening.

However, with the projector described in Patent Document 1, even when the air is sent to the light modulating device to cool the light modulating device from a direction which is parallel to the plate face of the fixing member, it is difficult to cool the light modulating device effectively.

Specifically, the sent air is split into a light incident side and a light exiting side of the light modulating device.

Then, the air split into the light incident side of the light modulating device circulates along the light incident-side end of the light modulating device and cools the light incident side of the light modulating device.

On the other hand, the air split into the light exiting side of the light modulating device circulates along the light exiting-side plate face of the fixing member. That is, since the light exiting-side end of the light modulating device is positioned in a position offset to the light incident side by a distance corresponding to the thickness of the fixing member, even when the air circulates along the light exiting-side plate face of the fixing member, the air is not effectively sent to the light exiting-side end of the light modulating device.

This makes it impossible to send the air effectively to both the light incident-side end and the light exiting-side end of the light modulating device, making it difficult to cool the light modulating device effectively.

SUMMARY

An advantage of some aspects of the invention is to provide a projector that can effectively cool a light modulating device.

A projector according to an aspect of the invention includes: a plurality of light modulating devices configured to modulate each of a plurality of color lights; a light combining optical device having a plurality of light incidence planes that faced a corresponding one of the light modulating devices, the light combining optical device configured to combine the color lights modulated by the plurality of light modulating devices; and fixing members each having a plate-like base in which an opening is formed, the fixing members configured to fix the light modulating devices to the light combining optical device, the light modulating devices are fixed to the fixing members by being inserted into the openings.

According to the aspect of the invention, the light modulating device is fixed to the fixing member as described above.

Moreover, since the light modulating device is in a state in which the light modulating device is inserted in the opening of the fixing member, it is possible to increase the area of contact between the light modulating device and the fixing member (the area of contact between the side edge part of the light modulating device and the edge of the opening). As a result, when the fixing member is formed of a highly thermal conductive material such as metal, it is possible to transfer heat from the light modulating device to the fixing member effectively and cool the light modulating device more effectively.

In the projector according to the aspect of the invention, it is preferable that each of the light modulating device be fixed to a corresponding one of the fixing members in a state in which a light incident-side end and a light exiting-side end of the light modulating device jut from a plate face of the base.

As a result, when air is sent to the light modulating device from a direction parallel to the plate face of the base in the fixing member, the air split into the light incident side and the light exiting side of the light modulating device is sent to the light incident-side end and the light exiting-side end of the light modulating device, the ends jutting from the plate face of the base.

Therefore, the amount of air sent to the light incident-side end and the light exiting-side end of the light modulating device is not limited by the fixing member, making it possible to cool the light modulating device effectively.

In the projector according to the aspect of the invention, it is preferable that the fixing members each include a pair of rising sections rising from a pair of end edges of the base, the end edges facing each other, in an out-of-plane direction of the base.

According to the aspect of the invention, with the rising sections, between the right and left side edge parts of the light modulating device and the pair of rising sections, it is possible to form a passage for air. This makes it possible to circulate the sent air along the right and left side edge parts of the light modulating device and cool the light modulating device effectively.

In the projector according to the aspect of the invention, it is preferable that the pair of rising sections include protruding sections, of which a protruding section of one rising section protrudes toward the other rising section and a protruding section of the other rising section protrudes toward the one rising section, and the light modulating devices each have a light incident-side end and a light exiting-side end, one of which is fixed to the protruding sections.

According to the aspect of the invention, since the light modulating device is fixed to the above-described protruding sections, the light modulating device can be fixed stably to the fixing member while being inserted in the opening of the fixing member.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described based on the drawings.

Configuration of Projector

Figure 1:
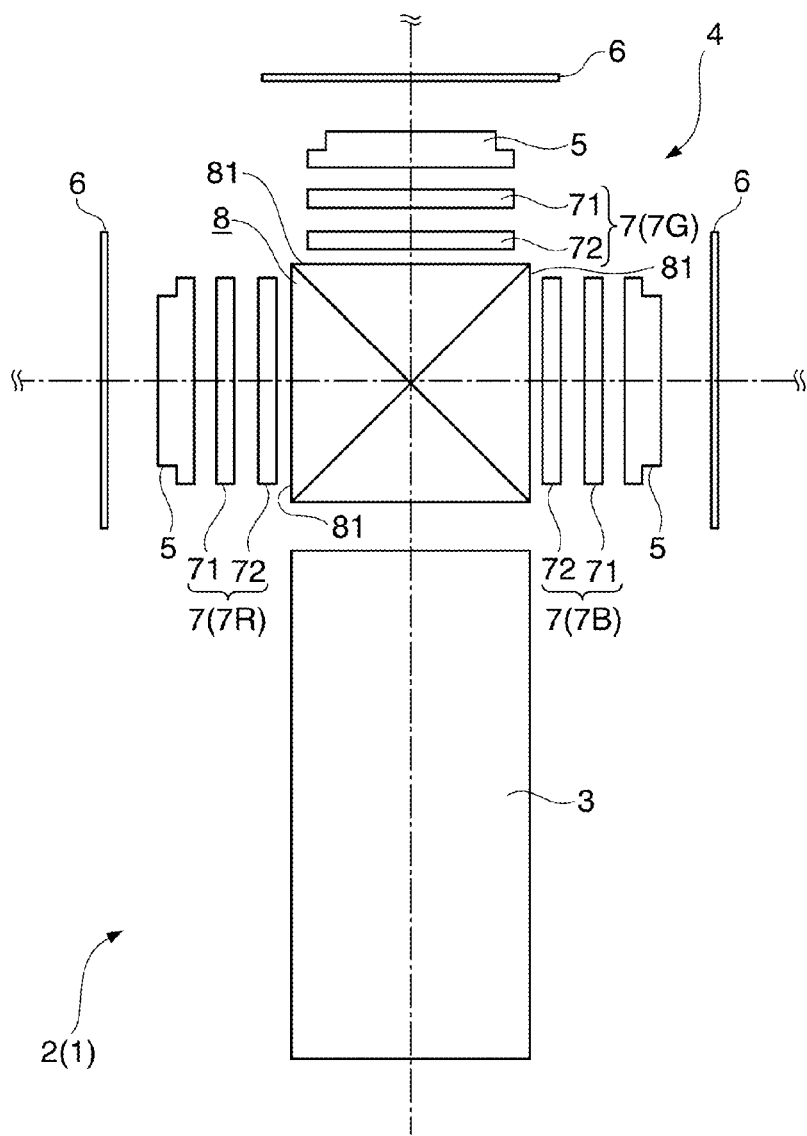
FIG. 1 is a diagram showing a schematic configuration of a projector in an embodiment.

FIG. 1 is a diagram showing a schematic configuration of a projector 1. Specifically, FIG. 1 is a plan view schematically showing an optical system of a projection unit 2 which is a principal portion of the present application.

The projector 1 projects an image and displays a projected image on a screen (not shown).

As shown in FIG. 1, the projector 1 includes the projection unit 2, a cooling device (not shown), etc. which are housed in an outer package (not shown).

The projection unit 2 modulates color lights: R (red), G (green), and B (blue) lights which are emitted from a light source device (not shown) and are obtained by separation performed by a color separation optical device (not shown) such as a dichroic mirror, combines the modulated color lights, and projects the resultant light.

As shown in FIG. 1, the projection unit 2 includes a projection lens 3 as a projection optical device and an optical device 4.

Configuration of Optical Device

Figure 2:
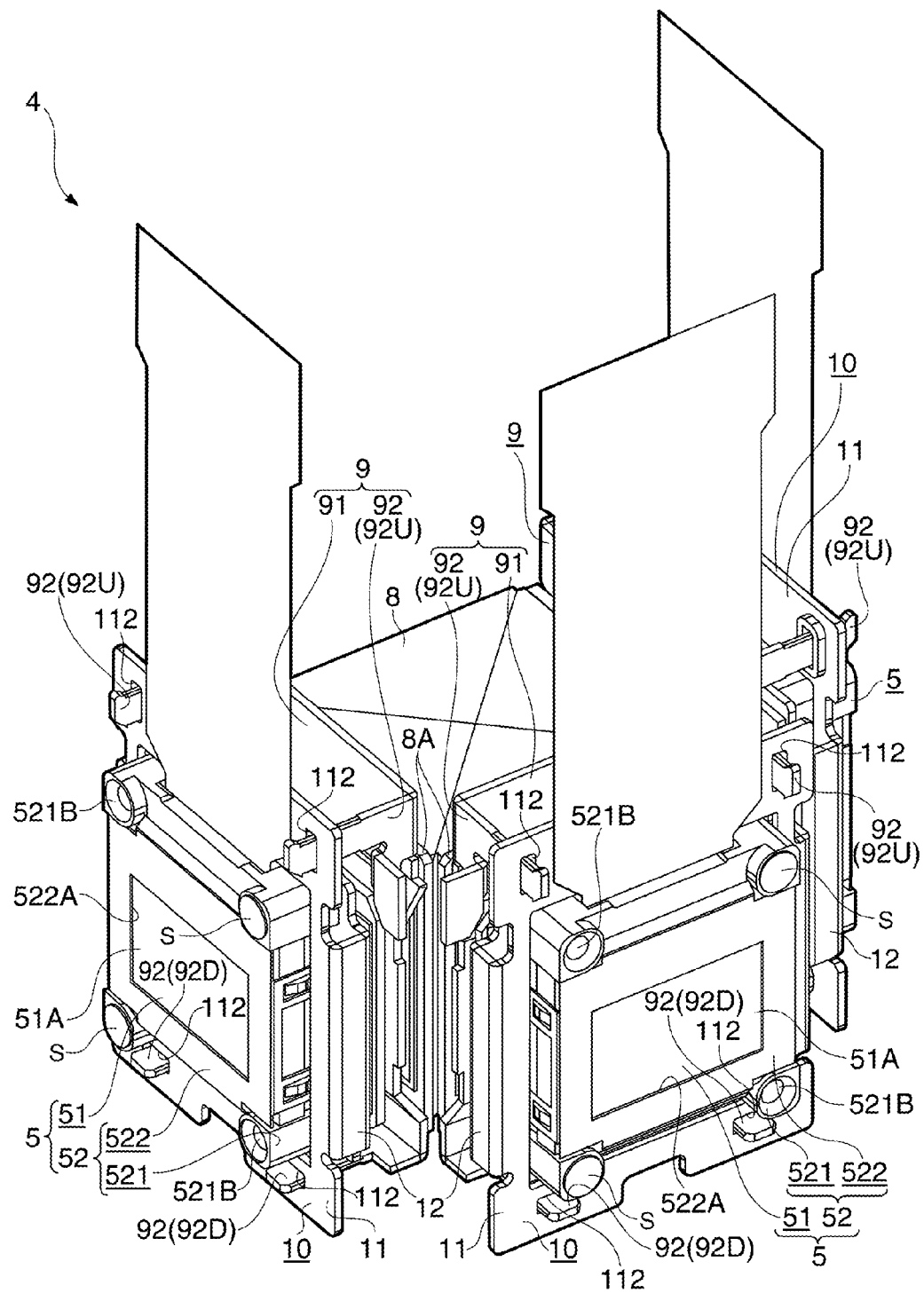
FIG. 2 is a perspective view showing the configuration of an optical device in this embodiment.

FIG. 2 is a perspective view showing the configuration of the optical device 4. Specifically, FIG. 2 is a perspective view showing the optical device 4 from a side opposite to a projection direction.

Incidentally, in FIG. 2, for convenience of explanation, three light incident-side polarizers 6 are not shown.

As shown in FIG. 1 or 2, the optical device 4 includes three light modulating devices 5, three light incident-side polarizers 6 (FIG. 1), three light exiting-side polarizers 7 (FIG. 1), a cross dichroic prism 8 as alight combining optical device, three supporting members 9 (FIG. 2), and three fixing members 10 (FIG. 2).

Configuration of Light Incident-Side Polarizer

The three light incident-side polarizers 6 are configured in the same manner and, as shown in FIG. 1, disposed in the optical device 4 on the sides thereof where R, G, and B color lights are incident. In addition, the light incident-side polarizers 6 each transmit only a predetermined linearly-polarized light of the incident color light.

Configuration of Light Modulating Device

The three light modulating devices 5 are configured in the same manner and, as shown in FIG. 1, disposed on the light exiting sides of the light incident-side polarizers 6.

As shown in FIG. 2, the light modulating devices 5 each include a liquid crystal panel 51 and a panel holding frame 52.

Though not shown specifically, the liquid crystal panel 51 is formed of a pair of transparent glass substrates between which a liquid crystal, which is an electrooptic material, is encapsulated. In the liquid crystal panel 51, the oriented state of the liquid crystal is controlled according to a drive signal from a control unit (not shown), whereby the polarization direction of the linearly-polarized light emitted from the light incident-side polarizer 6 is modulated.

Incidentally, a pair of pieces of dustproof glass 51A and 51B (see FIGS. 5 and 6) is attached to the light incident side and the light exiting side of the liquid crystal panel 51.

The pair of pieces of dustproof glass 51A and 51B is formed of a light-transmissive substrate made of a highly thermal conductive material such as crystal.

In this embodiment, as the pieces of dustproof glass 51A and 51B, a piece of glass having a planar shape which is about 20% greater than that of the previously used piece of dustproof glass is adopted.

The panel holding frame 52 is formed of a thermal conductive material such as metal and is a member into which the liquid crystal panel 51 is put.

As shown in FIG. 2, the panel holding frame 52 includes a main body 521 and a regulating plate 522.

The main body 521 is disposed on the light exiting side with respect to the regulating plate 522 and has a virtually rectangular shape in a plan view.

Though not shown specifically, the main body 521 has, on the light incident side thereof, a storage concave section depressed toward the light exiting side to conform to the outer shape of the liquid crystal panel 51.

The liquid crystal panel 51 is freely put into the storage concave section.

Moreover, in the bottom portion of the storage concave section, an opening 521A (see FIG. 6) corresponding to an image formation region of the liquid crystal panel 51 is formed.

Furthermore, in the main body 521, four fixing holes 521B are formed in such a way as to surround the storage concave section.

As shown in FIG. 2, the regulating plate 522 is formed of a rectangular plate body having, in a nearly central portion thereof in a plan view, an opening 522A corresponding to the image formation region of the liquid crystal panel 51. As a result of the regulating plate 522 being attached to the light incident side of the main body 521, the regulating plate 522 regulates the movement of the liquid crystal panel 51 from the storage concave section to the light incident side.

The above-described regulating plate 522 is formed of a highly reflective material. The regulating plate 522 reflects a color light which is outside the image formation region (the opening 522A), the light of the color lights shone onto the light modulating device 5. In this way, by making the regulating plate 522 reflect the above-described color light, the temperature of the light modulating device 5 is prevented from being increased by irradiation with light.

Incidentally, as the regulating plate 522, in addition to the regulating plate 522 formed of a highly reflective material, it is also possible to adopt a configuration in which a reflection coating such as metal is formed on a light incident-side end face.

Configuration of Light Exiting-Side Polarizer

The three light exiting-side polarizers 7 are formed in the same manner, and, as shown in FIG. 1, each light exiting-side polarizer 7 is disposed between a corresponding one of the light modulating devices 5 and a prism 8. As shown in FIG. 1, the light exiting-side polarizers 7 are each formed of two polarizers: a first polarizer 71 disposed on the light incident side and a second polarizer 72 disposed on the light exiting side.

The polarizers 71 and 72 have the same configuration as that of the light incident-side polarizers 6, and transmit only a predetermined linearly-polarized light of the incident color light.

Incidentally, the polarizers 71 and 72 are disposed in such a way that the transmission axes are nearly parallel to each other and are disposed so that they are nearly orthogonal to the transmission axis of a corresponding one of the light incident-side polarizers 6.

Configuration of Cross Dichroic Prism

As shown in FIG. 1 or 2, the prism 8 has three light incidence planes 81 on which the color lights that have passed through the light exiting-side polarizers 7 are incident, and combines the incident color lights.

The prism 8 is formed of four right-angle prisms bonded together and has a virtually square shape in a plan view, and, at the interface at which the right-angle prisms are bonded together, two dielectric multilayers are formed. The dielectric multilayers transmit a G color light which has passed through the G color light's-side light exiting-side polarizer 7 (7G (FIG. 1)) and reflect R and B color lights which have passed through the R and B color lights'-side light exiting-side polarizers 7 (7R and 7B (FIG. 1)). In this way, the color lights are combined. Then, a luminous flux (an image) obtained by the prism 8 is projected onto the screen via the projection lens 3.

Configuration of Supporting Member

The three supporting members 9 are configured in the same manner, and are each fixed to a corresponding one of the light incidence planes 81 of the prism 8 with a light-transmissive substrate 8A (FIG. 2) made of a highly thermal conductive material such as crystal placed between the supporting member 9 and the light incidence plane 81. The supporting members 9 support the light modulating devices 5, the light exiting-side polarizers 7, and the fixing members 10.

As shown in FIG. 2, the supporting members 9 are each formed by performing sheet-metal working on a plate body made of metal and each have a plate-like section 91 and four pins 92.

The plate-like section 91 is a portion which is fixed to the light-transmissive substrate 8A with an adhesive or the like, and, though not shown specifically, the plate-like section 91 is formed into a plate having a virtually rectangular shape in a plan view and having a rectangular opening (not shown) in a nearly central portion thereof.

Each second polarizer 72 is fixed to the light incident-side end face of the plate-like section 91 with an adhesive or the like.

The four pins 92 project from the four corner portions of the plate-like section 91 toward the light incident side.

Of the four pins 92, two pins 92U located in an upper part in FIG. 2 are each formed so as to project toward the light incident side by being bent at an axis along a vertical direction in FIG. 2 as a bending axis.

Moreover, two pins 92D located in a lower part in FIG. 2 are each formed so as to project toward the light incident side by being bent at an axis along a horizontal direction in FIG. 2 as a bending axis.

Configuration of Fixing Member

Figure 3:
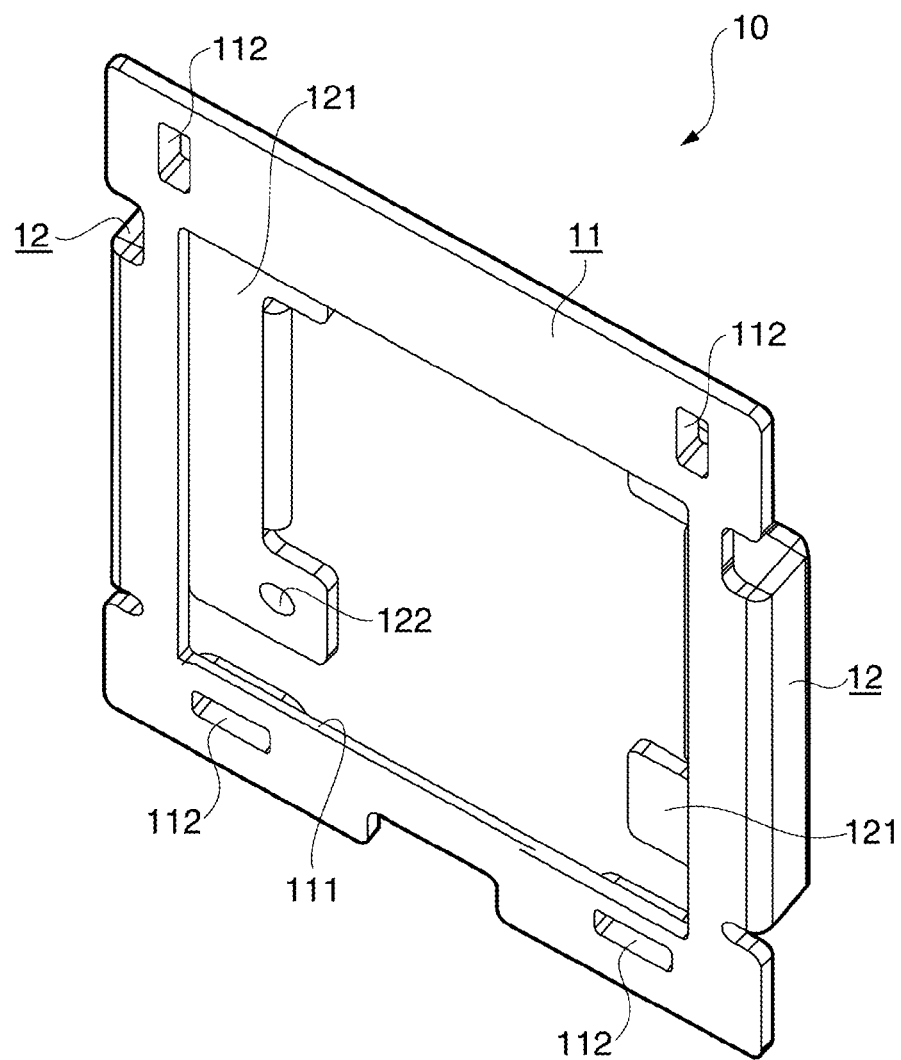
FIG. 3 is a perspective view showing the configuration of a fixing member in this embodiment.
Figure 4:
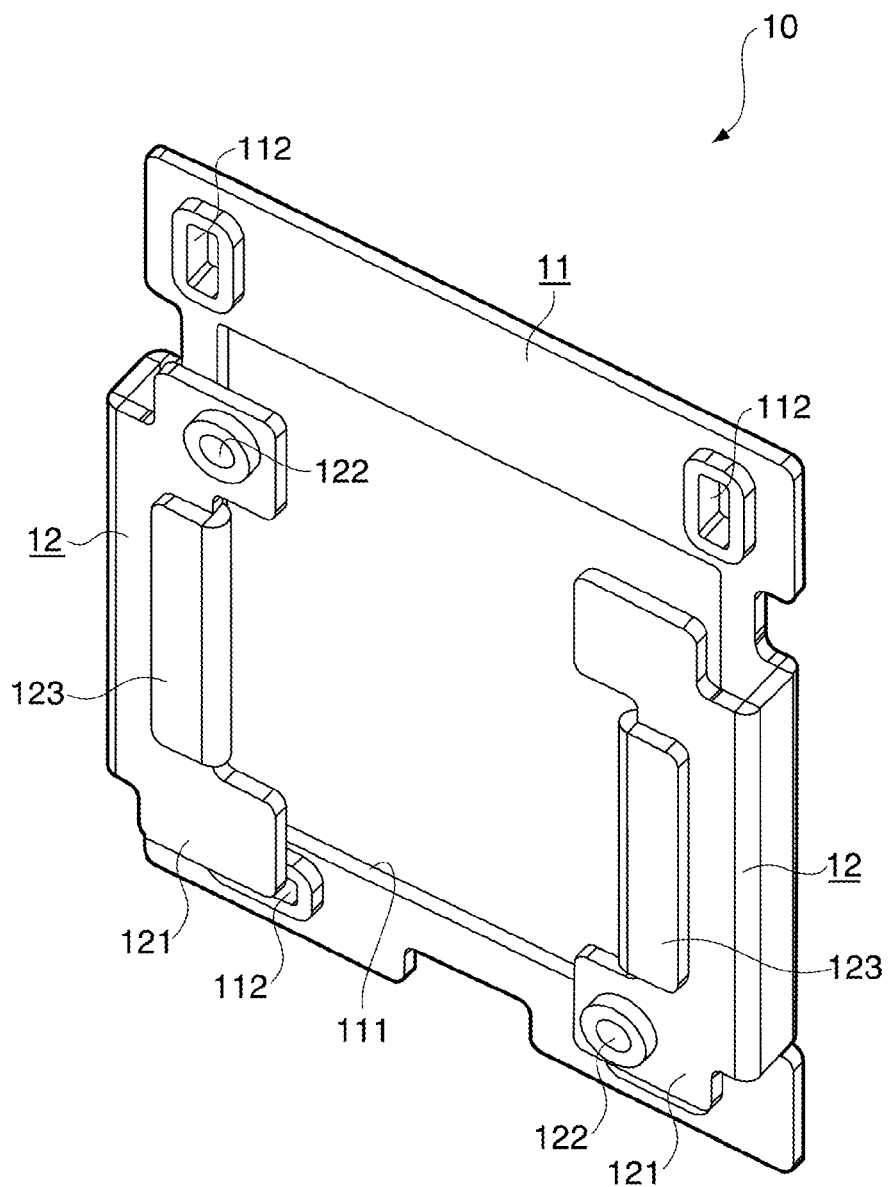
FIG. 4 is a perspective view showing the configuration of the fixing member in this embodiment.

FIGS. 3 and 4 are perspective views showing the configuration of the fixing member 10. Specifically, FIG. 3 is a perspective view of the fixing member 10 seen from the light incident side, and FIG. 4 is a perspective view of the fixing member 10 seen from the light exiting side.

The fixing member 10 is a member for integrating the first polarizer 71 with the light modulating device 5 and fixing them to the light incidence plane 81 of the prism 8 with the supporting member 9 placed between them and the light incidence plane 81.

As is the case with the supporting member 9, the fixing member 10 is formed by performing sheet-metal working on a plate body made of metal, and, as shown in FIG. 3 or 4, includes a base 11 and a pair of rising sections 12.

In this embodiment, the surface of the fixing member 10 is subjected to antireflection treatment.

As shown in FIG. 3 or 4, the base 11 is formed into a plate having a virtually rectangular shape in a plan view and having, in a nearly central portion thereof, a rectangular opening 111 corresponding to the planar shape of the light modulating device 5.

In this base 11, insertion holes 112 are formed at four corner portions.

As shown in FIG. 2, the fixing member 10 is supported by the supporting member 9 as a result of the four pins 92 of the supporting member 9 being placed through the corresponding insertion holes 112.

The pair of rising sections 12 rises from a pair of end edges (in FIGS. 3 and 4, end edges in a horizontal direction) of the base 11, the end edges facing each other, toward the light exiting side (in an out-of-plane direction of the plate face in the base 11).

As shown in FIG. 3 or 4, the pair of rising sections 12 is formed by bending two parts by using an axis along a vertical direction as a bending axis.

The pair of rising sections 12 is set so that tip sections 121 thereof serving as protruding sections protrude in such a way that the tip portion 121 of one rising section 12 protrudes toward the tip portion 121 of the other rising section 12 and vice versa (come close to each other) and are parallel to the base 11.

In the tip portions 121, as shown in FIG. 3 or 4, a threaded hole 122 is formed on the upper part side of one tip portion 121 and on the lower part side of the other tip portion 121.

Moreover, a polarizer supporting section 123 is formed in a nearly central portion of each tip portion 121 in a vertical direction in FIG. 4, the polarizer supporting section 123 formed so as to be parallel to the base 11 by being bent at an axis along a vertical direction as a bending axis toward the light exiting side.

The first polarizers 71 are put on the polarizer supporting sections 123 and are fixed with an adhesive or the like.

Method for Fixing Light Modulating Device to Fixing Member

Next, a method for fixing the light modulating device 5 to the fixing member 10 described above will be described.

Figure 5:
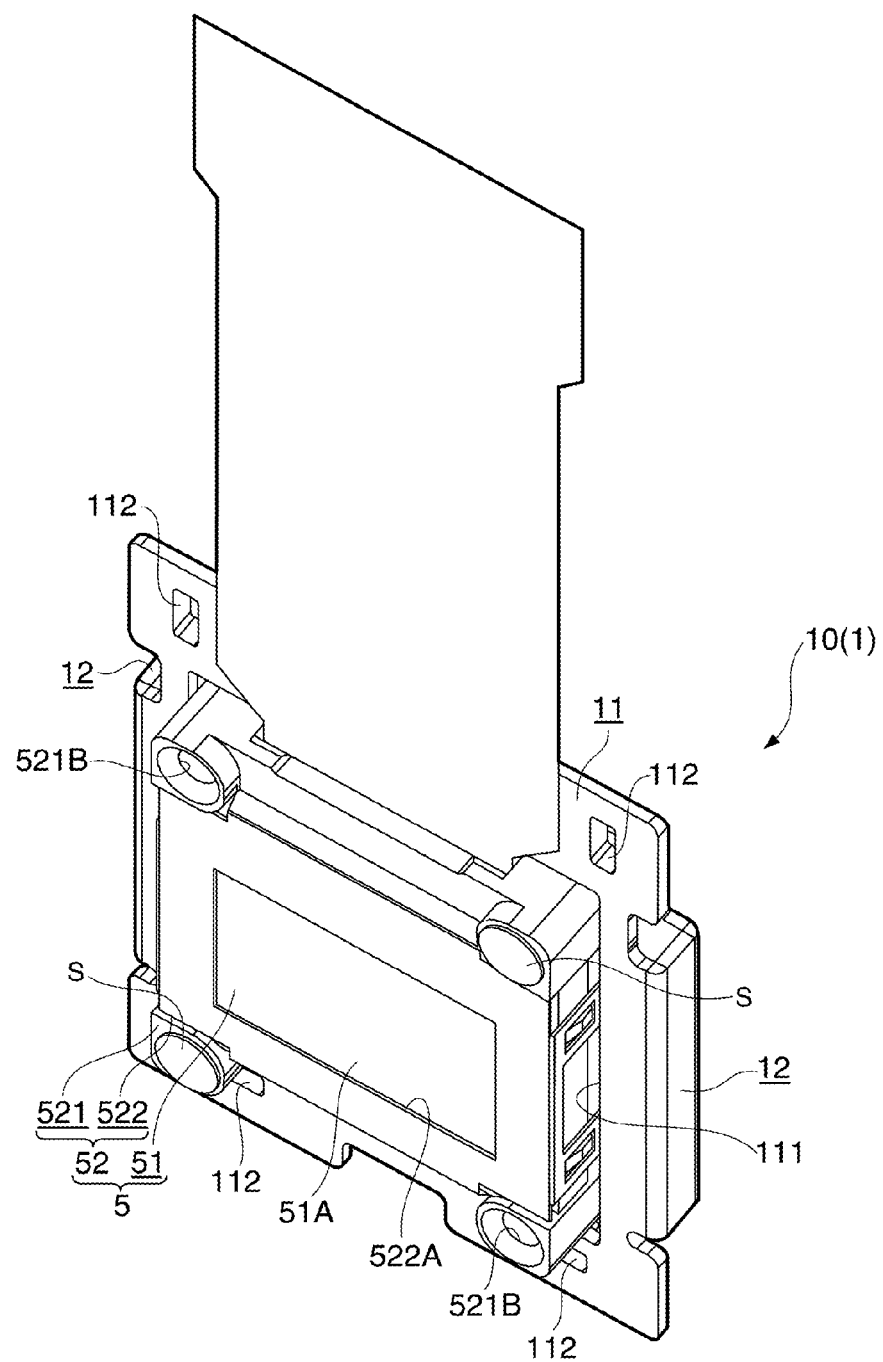
FIG. 5 is a diagram showing a state in which a light modulating device is fixed to the fixing member in this embodiment.
Figure 6:
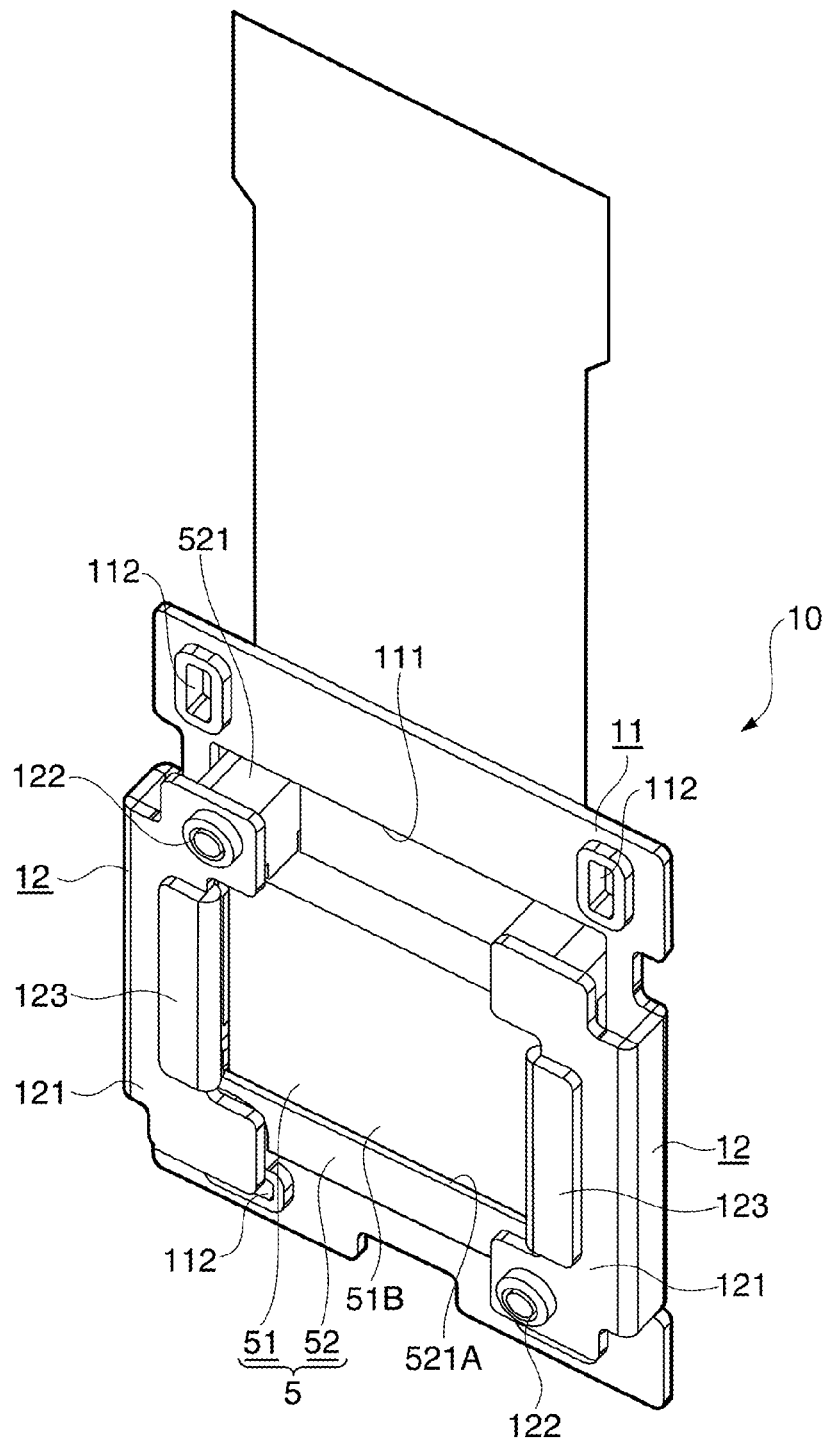
FIG. 6 is a diagram showing a state in which the light modulating device is fixed to the fixing member in this embodiment.
Figure 7:
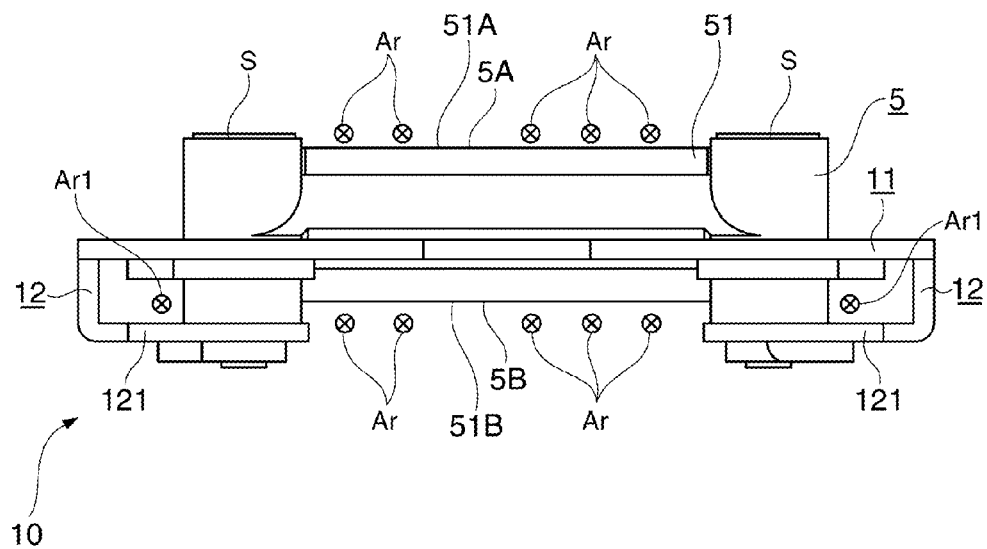
FIG. 7 is a diagram showing a state in which the light modulating device is fixed to the fixing member in this embodiment.

FIGS. 5 to 7 are diagrams showing a state in which the light modulating device 5 is fixed to the fixing member 10. Specifically, FIG. 5 is a perspective view showing the state seen from the light incident side, FIG. 6 is a perspective view showing the state seen from the light exiting side, and FIG. 7 is a plan view showing the state seen from below.

As shown in FIGS. 5 to 7, an operator inserts the light modulating device 5 into the opening 111 from the light incident side of the fixing member 10 and makes the light modulating device 5 abut against the tip portions 121 of the pair of rising sections 12.

Then, the operator places fixation screws S (FIGS. 5 and 7) through two fixing holes 521B of the four fixing holes 521B in the light modulating device 5, the two fixing holes 521B located in diagonal positions, from the light incident side, and screws the fixation screws S into the threaded holes 122 in the fixing member 10.

In this way, the light modulating device 5 is fixed to the fixing member 10.

In the above-described fixed state, as shown in FIG. 7, the light modulating device 5 is in a state in which a light incident-side end 5A juts toward the light incident side with respect to the plate face of the base 11 and a light exiting-side end 5B juts toward the light exiting side with respect to the plate face of the base 11.

Cooling Passage Created by Cooling Device

Though not shown specifically, the cooling device sends air to each light modulating device 5 from below and from a direction parallel to the plate face of the base 11 in FIG. 2.

As shown in FIG. 7, air Ar sent to the light modulating device 5 is split into the light incident side and the light exiting side of the light modulating device 5.

That is, the air Ar split into the light incident side of the light modulating device 5 circulates along the light incident-side end 5A and cools the light incident side of the light modulating device 5 and the light incident-side polarizer 6.

On the other hand, the air Ar split into the light exiting side of the light modulating device 5 circulates along the light exiting-side end 5B and cools the light exiting side of the light modulating device 5 and the light exiting-side polarizer 7.

According to the embodiment described above, the following effects are obtained.

In this embodiment, the light modulating device 5 is inserted into the opening 111 and is fixed to the fixing member 10 in a state in which the light incident-side end 5A and the light exiting-side end 5B jut with respect to the plate face of the base 11.

As a result, the air Ar which is sent from the cooling device and split into the light incident side and the light exiting side of the light modulating device 5 is sent to the light incident-side end 5A and the light exiting-side end 5B of the light modulating device 5, the ends 5A and 5B jutting from the plate face of the base 11.

Therefore, the amount of air sent to the light incident-side end and the light exiting-side end of the light modulating device 5 is not limited by the fixing member 10, making it possible to cool the light modulating device 5 effectively.

In particular, in this embodiment, as the pair of pieces of dustproof glass 51A and 51B, a piece of glass having a planar shape which is about 20% greater than that of the previously used piece of dustproof glass is adopted. As a result, in addition to the above-described effect obtained by the configuration in which the light incident-side end 5A and the light exiting-side end 5B are made to jut from the plate face of the base 11, it is possible to improve the efficiency of heat exchange between the sent air and the pair of pieces of dustproof glass 51A and 51B and thereby cool the light modulating device 5 more effectively.

Moreover, since the light modulating device 5 is in a state in which it is inserted in the opening 111 of the fixing member 10, it is possible to increase the area of contact between the light modulating device 5 and the fixing member 10 (the area of contact between the side edge part of the light modulating device 5 and the edge of the opening 111). This makes it possible to transfer heat from the light modulating device 5 to the fixing member 10 effectively and thereby cool the light modulating device 5 more effectively.

Furthermore, since the light modulating device 5 is fixed to each tip portion 121, the light modulating device 5 can be fixed stably to the fixing member 10 while being inserted in the opening 111.

Moreover, with the pair of rising sections 12, between the right and left side edge parts of the light modulating device 5 and the pair of rising sections 12, it is possible to form a passage for air Ar1 (FIG. 7) sent from the cooling device. This makes it possible to circulate the sent air Ar1 along the right and left side edge parts of the light modulating device 5 and cool the light modulating device 5 effectively.

Furthermore, since the surface of the fixing member 10 is subjected to antireflection treatment, it is possible to prevent the light reflected from the light exiting-side polarizer 7 or the prism 8 and moving toward the light modulating device 5 (each tip portion 121) from traveling toward the light exiting-side polarizer 7 after being reflected again from each tip portion 121 and thereby prevent the stray light from entering the projected image.

It is to be understood that the invention is not limited in any way by the embodiment thereof described above, and, unless modifications and variations depart from the scope of the invention, they should be construed as being included therein.

In the embodiment described above, the light modulating device 5 is fixed to the fixing member 10 by being connected to each tip portion 121; however, the invention is not limited to this configuration. That is, the light modulating device 5 may be fixed to the fixing member 10 in any other manner as long as the light modulating device 5 is inserted into the opening 111 and the light incident-side end 5A and the light exiting-side end 5B jut from the plate face of the base 11.

In the embodiment described above, the pair of rising sections 12 is formed so as to protrude toward the light exiting side with respect to the base 11; however, the invention is not limited to this configuration. The pair of rising sections 12 may be formed so as to protrude toward the light incident side, that is, the fixing member 10 shown in FIG. 3 or 4 may be configured so that the light incident side and the light exiting side face in directions opposite to those shown in the drawing.

The invention can be used in a projector used for a presentation or a home theater.

What is claimed is:

1. A projector, comprising:
    a plurality of light modulating devices configured to modulate each of a plurality of color lights, each light modulating device having a light-incident side end and a light-exiting side end;
    a light combining optical device having a plurality of light incidence planes that face a corresponding one of the light modulating devices, the light combining optical device configured to combine the color lights modulated by the plurality of light modulating devices; and
    fixing members configured to fix the light modulating devices to the light combining optical device, each fixing member having a plate-like base in which an opening is formed, a pair of rising sections extending in a direction perpendicular to the plate-like base from a pair of end edges on opposing ends of the plate-like base, and a pair of protruding sections of which a protruding section of one rising section protrudes toward the other rising section and a protruding section of the other rising section protrudes toward the one rising section,
    the light modulating devices are fixed to the fixing members by being inserted into the openings such that one of the light-incident side end or the light-exiting side end of each light modulating device abuts against the corresponding protruding sections.

2. The projector according to claim 1, wherein
    each of the light modulating devices is fixed to a corresponding one of the fixing members in a state in which a light incident-side end and a light exiting-side end of the light modulating device jut from a plate face of the base.

3. The projector according to claim 1, wherein the light modulating devices each have a light incident-side end and a light exiting-side end, one of which is fixed to the protruding sections.

4. The projector according to claim 3, wherein the fixing members each include polarizer supporting sections bent from the protruding sections toward the light exiting side.

5. The projector according to claim 1, further comprising: supporting members each having a plate-like section and four pins projecting from four corner portions of the plate-like section toward the light incident side and supporting a corresponding one of the fixing members.

6. The projector according to claim 1, further comprising: a cooling device that sends air to the light modulating devices; and
the air is split into the light-incident side and the light-exiting side of each light modulating device, and circulates along the light-incident side end and the light-exiting side end.

7. The projector according to claim 6, wherein the light modulating devices have right and left side edge parts, and
the right and left side edge parts and the pair of rising sections form a passage for air sent from the cooling device.

* * * * *